(12) United States Patent
Lin

(10) Patent No.: US 7,313,572 B2
(45) Date of Patent: Dec. 25, 2007

(54) ATTRIBUTE PARTITIONING FOR USER EXTENSIBILITY

(75) Inventor: Zhenhai Lin, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 585 days.

(21) Appl. No.: 10/676,658

(22) Filed: Sep. 30, 2003

(65) Prior Publication Data

US 2005/0071345 A1 Mar. 31, 2005

(51) Int. Cl.
*G06F 7/00* (2006.01)
(52) U.S. Cl. .................. 707/103 Y; 707/101; 707/102
(58) Field of Classification Search ............ 707/1–100, 707/102, 103
See application file for complete search history.

(56) References Cited

U.S. PATENT DOCUMENTS

| | | | | |
|---|---|---|---|---|
| 6,529,909 | B1 | 3/2003 | Bowman-Amuah | .......... 707/10 |
| 6,615,204 | B1* | 9/2003 | Menon | ........................ 707/3 |
| 6,728,694 | B1 | 4/2004 | Ramasamy et al. | ............ 707/2 |
| 6,728,726 | B1 | 4/2004 | Bernstein et al. | ........... 707/103 |
| 2003/0154197 | A1* | 8/2003 | Millet et al. | .................... 707/9 |
| 2004/0267744 | A1* | 12/2004 | Becker et al. | .................. 707/8 |

* cited by examiner

*Primary Examiner*—John Cottingham
*Assistant Examiner*—Robert M Timblin
(74) *Attorney, Agent, or Firm*—Hickman Palermo Truong & Becker LLP; Brian D. Hickman

(57) ABSTRACT

A method and data structure for storing application object type data in a repository are provided. Techniques are provided to allow users to store data for a number of custom attributes of application object types in repository tables without adding any new columns to the existing repository tables. According to one technique, data for all custom attributes of the same data type, regardless of the object type they belong to, is stored in the same table. Techniques are also provided to allow users to store data for a number of custom object types without adding any new tables to the repository. According to one technique, information identifying the attributes of a custom object type is stored in a catalog table, and the data for the attributes is stored in tables corresponding to the attributes' data types. Techniques are further provided that allow retrieval of data for custom object types and custom attributes stored in the repository tables.

38 Claims, 4 Drawing Sheets

ATTRIBUTE PARTITIONING FOR USER EXTENSIBILITY

FIELD OF THE INVENTION

The present invention relates to storing application data in database system repositories, and, more particularly, to partitioning attributes of application object types for user extensibility.

BACKGROUND OF THE INVENTION

Data in a business application is logically organized in one or more object types which represent the different entities supported by the application. Each object type includes one or more attributes which characterize or describe the object type. The object types that are defined during the application development are usually referred to as default object types. The attributes included in a default object type are usually referred to as default attributes of the object type.

Each attribute typically has attribute-identifying information and a data type associated with it. Data stored in each object type is usually organized in a number of object instances. An object instance is a set of data that is uniquely distinguishable from other similar sets of data within the object type, and the data within each object instance is organized in data items corresponding to each attribute of the object type. The data item stored in each attribute is of the data type associated with the attribute.

Application data is physically stored in a repository which is typically implemented as a database management system (DBMS). A DBMS is sometimes also referred to as a database. Data in a DBMS is stored in one or more data containers, each container contains records, and the data within each record is organized in one or more fields. In relational database systems, the data containers are referred to as tables, the records are referred to as rows, and the fields are referred to as columns. In object-oriented databases, the data containers are referred to as classes, the records are referred to as objects, and the fields are referred to as attributes. Other database architectures may use other terminology.

Systems that may implement the present invention are not limited to any particular type of database architecture. However, for the purposes of explanation, the examples and the terminology used herein shall be that typically associated with relational databases. Thus, the terms "table", "row" and "column" shall be used herein to refer respectively to the data container, record, and field.

In the application data repository, object types are usually mapped to tables, object instances are usually mapped to rows, and object type attributes are usually mapped to columns. However, one-to-one mappings between object types and tables, between object instances and rows, and between object type attributes and columns are not required. In complex applications a single object type may be mapped to several tables, a single object instance may be mapped to a different row in each of those several tables, and a single object type attribute may be mapped to several columns in several tables.

Business applications are usually designed to handle only the most common scenarios. The default object types and the default object type attributes, along with their corresponding tables and columns in the data repository, are fixed at the time the application is developed. When an application is deployed, the actual business data is mapped to the default application object types and is stored as rows in the repository tables in the form of object instances.

An example of application data stored in a repository is shown in FIG. 1. At development time, an object type named "City" and an object type named "Product" are included in an application (not shown). A table 110 named "City" and a table 120 named "Product" are created in a repository to store the data for object types "City" and "Product" respectively. Table 110 includes a column 112 with a column name "ID", a column 114 with a column name "NAME", and a column 116 with a column name "REGION". Table 120 includes a column 122 with a column name "ID", a column 124 with a column name "NAME", and a column 126 with a column name "DESCRIPTION".

When the application is deployed, user data is mapped to the "City" and "Product" object types, and is stored as rows of data in tables 110 and 120 respectively. Row 118 is a typical representative of the rows stored in table 110, and, as shown, stores a value "1001" in column "ID", a value "San Francisco" in column "NAME", and a value "West Coast" in column "REGION". Row 128 is a typical representative of the rows stored in table 120, and, as shown, stores a value "1011" in column "ID", a value "Wheel" in column "NAME", and a value "For Cars" in column "DESCRIPTION".

However, since most applications are generic and are designed to handle only the most common scenarios, the user data almost never completely maps to the default object types. The user may have data that does not fit into the default object types but is nevertheless vital for the operation of the business. In order to be able to store and use such data, the user needs to extend the application by adding new object types or by adding custom attributes to existing object types.

An example of such a scenario is illustrated in FIG. 2. With respect to object type "City", the user needs to add the custom attributes "POPULATION" and "STATE". Similarly, with respect to object type "Product", the user needs to add the custom attribute "CATEGORY". In addition, the user needs to add a new object type "County" with attributes "ID", "COUNTY_NAME", "COUNTY_STATE", and "COUNTY_AREA".

In order to be able to store the data for the new custom attributes of the object type "City", table 110 must be extended to include a column 210 with a column name "POPULATION", and a column 212 with a column name "STATE". Values for these custom attributes may be stored in table 110. For example, row 118 stores a value "700,000" in column "POPULATION" and a value "California" in column "STATE". Similarly, in order to be able to store the data for the new custom attribute of the object type "Product", table 120 must be extended to include a column 216 with a column name "CATEGORY". Values for the "CATEGORY" custom attribute may then be stored in table 120. For example, row 128 stores a value "Automotive" in column "CATEGORY".

In order to be able to store the data for the new object type "County", a new table 220 with a name "County" needs to be created. Table 220 includes a column 222 with a column name "ID", a column 224 with a column name "COUNTY_NAME", a column 226 with a column name "COUNTY_STATE", and a column 228 with a column name "COUNTY_AREA". Row 230 is a typical representative of the rows stored in table 220, and, as shown, stores a value "1021" in column "ID", a value "Cook" in column "COUNTY_NAME", a value "Illinois" in column "COUNTY_STATE", and a value "850" in column "COUNTY_AREA".

Scenarios like the one described above arise very often when generic applications with default object types are used to store user-specific data. One problem with extending the repository tables in this manner is that the application may not be able to recognize the custom tables and the custom attributes, and may become unstable or even may completely stop functioning.

Furthermore, upon an upgrade of the application, data stored in the custom tables and in the custom columns of existing tables is typically lost because the upgraded application is not aware of any previously-made user customizations. Thus, the upgrade operation itself does not account for all custom changes to the repository tables that a user can possibly make. A typical application upgrade operation first creates new tables supporting the object types included in the upgrade, copies the data from the old tables to the new tables, and deletes the old tables. Since the upgrade operation is not aware of any custom columns added by the user, the operation does not structure the new tables to support the custom attributes and does not copy the data for these custom attributes in the new tables. Moreover, the typical upgrade operation does not account at all for any custom tables that were added by the user.

One solution to the problem of losing the user-customizations during an upgrade operation is design the application with knowledge of additional, initially unused columns within the repository tables. When customization is needed, the user can use one or more of the "extra" columns to store data for the new custom attributes that need to be added to the existing object types. Because the application knows that the extra columns exist, the extra columns, and any data stored therein, may be taken into account during the upgrade operation. Specifically, the upgraded version of the application may define tables with extra columns as well, and data from the extra columns of the old tables may be copied into the extra columns of the new table during the upgrade operation.

The use of extra application-established columns, however, has several major disadvantages. First, leaving additional unused columns in the repository tables puts a limit on the number of custom attributes that a user can add to the object types of the application. Second, leaving a large number of unused columns in repository tables creates a lot of unnecessary overhead when data in the table is accessed, and, in the case of tables with large number of rows, may lead to a huge waste of storage space. Third, the extra application-established columns solution only allows for new attributes of existing object types, and does not at all address the issue of extending the application to support entirely new object types.

Based on the foregoing, it is desirable to provide a technique by which the user of an application can extend the existing object types with a virtually unlimited number of additional attributes without adding any new columns to existing tables, and can create any number of additional object types in the repository without adding any new tables.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
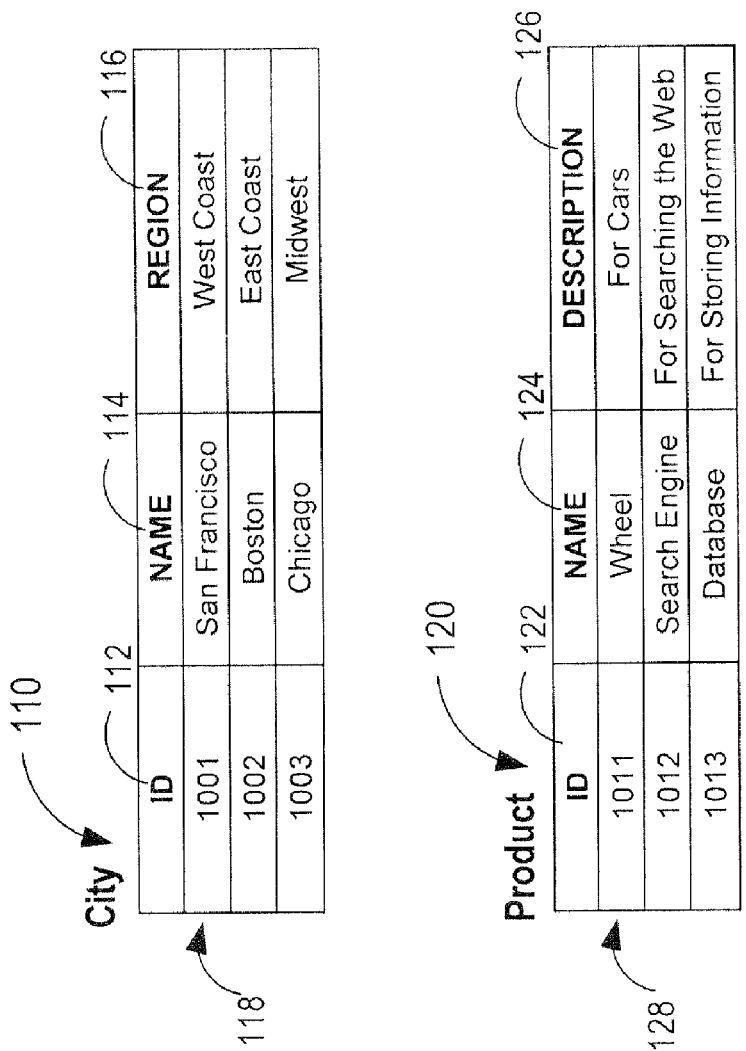
FIG. 1 is a block diagram that illustrates application-provided tables storing data for application object types.

A method and data structure for storing application object type data in a repository are described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Techniques are provided to allow users to store data for an unlimited number of custom attributes of application object types in repository tables without adding any new columns to the existing tables. According to one aspect of the invention, a mechanism is provided to allow users to store data for any number of additional custom object types in the repository without adding any new tables. Techniques are also provided that allow performing upgrades to an application without modifying the repository or the repository tables, and without overwriting or losing the data for custom object types and custom attributes of existing object types. Furthermore, techniques are provided that allow retrieval of data for custom object types and data for custom attributes stored in the repository tables. According to one aspect of the invention, techniques are provided that allow storing in memory data that identifies custom attributes for a plurality of object types.

Custom-Attribute Tables

According to one embodiment, techniques are provided for storing the data for custom attributes of application object types in tables that are referred to herein as "custom-attribute tables". Support for custom-attribute tables is included in the application at development time. For this reason, the application (and therefore the upgrade operation) "knows of" and accounts for custom-attribute tables, and thus the data for the custom attributes stored in these tables is not overwritten or lost during an upgrade.

According to one embodiment, within a custom-attribute table, each custom attribute is not assigned its own column. Rather, a single column is provided for storing data for all custom attributes of the same data type. Thus, when several custom attributes are of the same data type, values for the several distinct custom attributes may be stored in the same column. As long as the custom attributes are of the same data type, values for the custom attributes can be stored in the same column regardless of whether the custom attributes belong to the same object type. For example, using the techniques described herein, the same column may be used to store data for a first custom attribute of a first object type and data for a second custom attribute of a second object type, where the first and second custom attributes have the same data type.

Per-Data-Type Custom-Attribute Tables

According to one embodiment, when the custom attributes that have been added to the object types of an application correspond to a plurality of different data types, a separate custom-attribute table is established for storing the values of each of the different data types. Thus, the number of custom-attribute tables used to support custom attributes increases relative to the number of data types of the custom attributes, and not relative to the number of custom attributes themselves. For example, assume that a particular user has added three custom attributes to each of three object types. If all nine custom attributes are of the same data type, then only a single custom-attribute table is used to store the values of all nine custom attributes. On the other hand, if each of the nine custom attributes has a different data type, then nine distinct custom-attribute tables are used to store the values for the nine custom attributes.

An object type of an application may be extended with custom attributes of more than one data type. In that case, data for a first custom attribute of the object type may be stored in one table based on the fact that the first custom attribute has a first data type, while data for a second custom attribute of the same object type may be stored in a second table based on the fact that the second custom attribute has a second data type that is different from the first data type.

Structure of Custom-Attribute Tables

A custom-attribute table includes a number of columns. According to one embodiment, the custom-attribute table includes one or more instance-identifying columns, one or more attribute-identifying columns, and one or more value columns. Each row of the custom-attribute table holds data that is associated with a particular object instance of a particular object type. Thus, the instance-identifying column or columns store data that uniquely identifies an object instance, the attribute-identifying column or columns store data that identifies a custom attribute of the object instance, and the value column or columns store the value of the custom attribute identified in the attribute-identifying column or columns.

As mentioned above, each custom-attribute table is associated with a data type. The value column or columns are defined in such a ways as to provide storage for values that are of the data type that is associated with the custom-attribute table.

Figure 3:
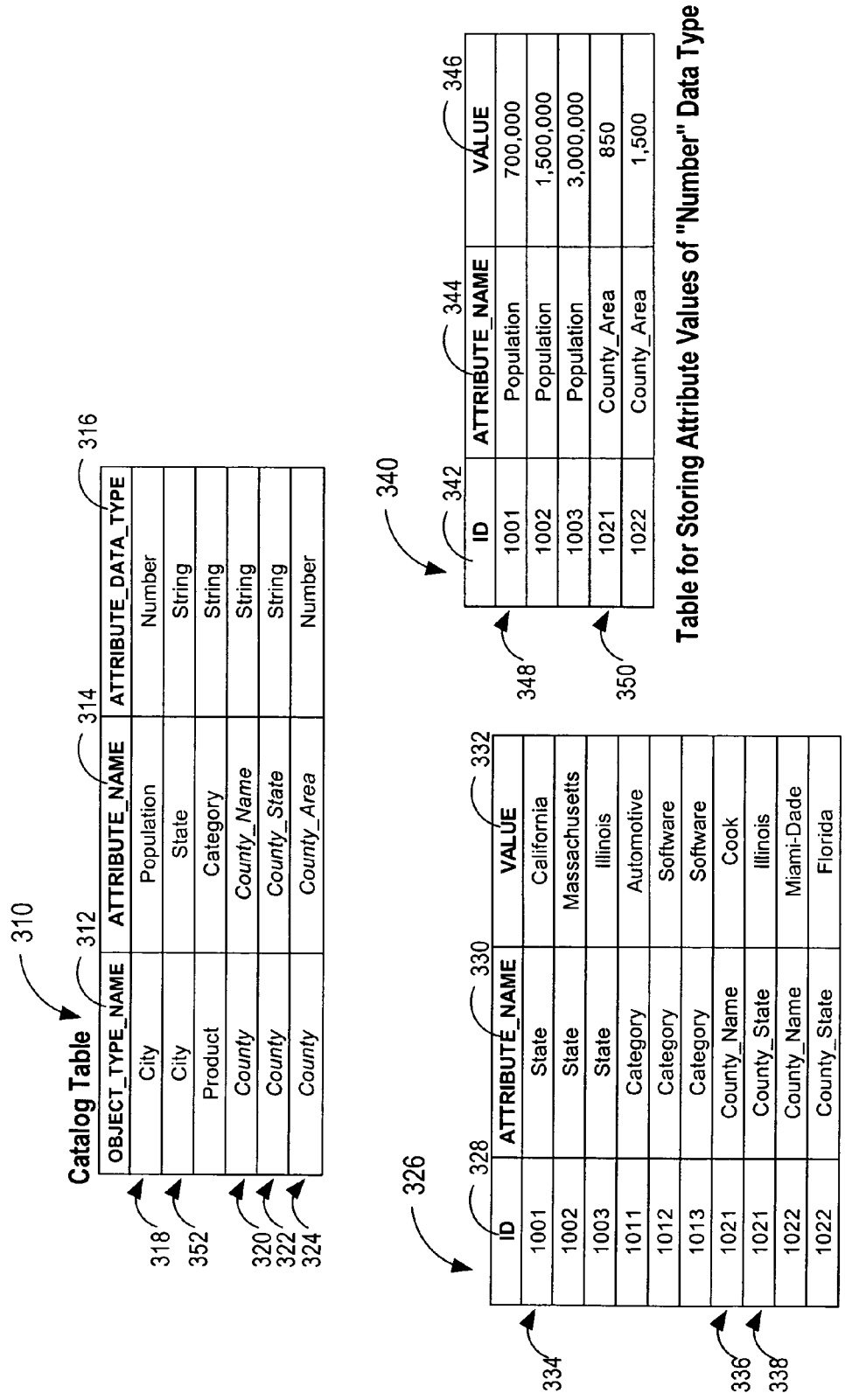
FIG. 3 illustrates, by way of example, a technique for user-extensible partitioning of application attributes by storing into tables data for custom attributes and custom object types under an embodiment of the invention.

A custom-attribute table under one embodiment is shown in FIG. 3. Table 326, as shown, is designated for storing data for custom attributes of a "String" data type. Table 326 includes an instance-identifying column 328 with a column name "ID", an attribute-identifying column 330 with a column name "ATTRIBUTE_NAME", and a value column 332 with a column name "VALUE". Row 334 is a typical representative of the rows stored in table 326, and, as shown, stores a value "1001" in column "ID", a value "State" in column "ATTRIBUTE_NAME", and a value "California" in column "VALUE". Thus, row 334 indicates that an object instance, uniquely identified by the object instance identifier "1001", has a custom attribute named "State" with a value of "California".

In the example described above, the instance-identifying column 328 stores data of a "Number" data type and the attribute-identifying column 330 stores data of a "String" data type. However, the instance-identifying and the attribute-identifying columns can be of any data type supported in the particular data repository and are not limited to "Number" or "String" data types. The value column 332 stores data of a "String" data type, but it can also be of any data type supported by the particular data repository.

Application Upgrades

According to one embodiment, techniques are provided for upgrading an application without losing previously-made user-customizations to the data repository that is used by the application. An upgrade to the application may include modifying the structure of some or all repository tables that store data. According to the techniques provided, the application is designed with support for custom-attribute tables (e.g. tables 326 and 340), even though the uncustomized application does not store any data in those tables. Because the application is aware of the custom-attribute tables, the application upgrade operations take into account the custom-attribute tables, and the data for the custom attributes stored in these tables is not overwritten or lost during an upgrade.

For example, assume that a repository has a first table for storing the default attributes of a first object type, a second table for storing the default attributes of a second object type, and a third table for storing a custom attribute of the first object type and a custom attribute of the second object type. Under these circumstances, an upgrade of the application includes processing the data stored in the first table, processing the data stored in the second table, and retaining in the third table the data for the first and second custom attributes.

In foregoing example, the data in the first table may be processed, for example, by creating a first replacement table according to the requirements of the upgrade, copying to the first replacement table the data for the default attributes of the first object type stored in the first table, and deleting the first table. The upgrade of the application includes similar steps to process the data in the second table. Specifically, processing the data in the second table includes creating a second replacement table, copying to the second replacement table the data for the default attributes of the second object type stored in the second table, and deleting the second table.

As mentioned above, the data values for the first custom attribute of the first object type and the data values for the second custom attribute of the second object type are retained in the third table during the upgrade of the application. The structure of the third table is not modified, and the data stored in the third table is not copied to a replacement table.

As another example, assume that the repository used by an application includes a first table that stores data for one or more default attributes of an object type, a second table that stores data for a first custom attribute of the object type having a first data type, and a third table that stores data for a second custom attribute of the object type having a second data type that is different from the first data type. Under these circumstances, an upgrade of the application includes processing the data stored in the first table, and retaining in the second and third tables the data for the first and second custom attributes respectively.

Processing the data in the first table may include, for example, creating a first replacement table according to the requirements of the upgrade, copying to the first replacement table the data stored in the first table for the default attributes of the object type, and deleting the first table. During the upgrade of the application, the data values for the first custom attribute of the object type are retained in the second table. Similarly, the data values for the second custom attribute of the object type are retained in the third table. The structures of the second and third tables are not modified, and the data stored in the second and third tables is not copied to other replacement tables.

The provided upgrade techniques are not limited to upgrading a repository that includes tables for only one or two object types. Any number of repository tables storing default attributes of application object types can be upgraded using the techniques described above. Furthermore, each table that stores default attributes may store default attributes of more than one application object type.

The described upgrade techniques allow a user to upgrade an application with any number of custom-attribute tables. The data for the custom attributes can be of more than one data type. According to the upgrade techniques described above, tables storing data for custom attributes are not modified or changed. However, since all the repository tables for storing data for custom attributes are included in the application at development time, an application upgrade "knows" of these tables. For this reason, the tables storing data for custom attributes may also be modified or changed and data stored in them may also be copied to replacement tables provided by the upgrade.

Globally Unique Object Instance Identifier

According to one aspect of the invention, a mechanism is used to assign a globally unique object instance identifier to each object instance that makes use of any custom-attribute table. By assigning each object instance a globally unique instance identifier, the DBMS can match custom attribute values to object instances based on the instance identifier.

In the embodiment described above, each custom-attribute table is associated with a data type, and stores values for all custom attributes of that data type. Since many object types may have custom attributes of the same data type, each custom-attribute table may store values for a variety of different object types. An instance identifier value is assigned to every object instance of every object type. According to one embodiment, the instance identifier value is unique relative to every object instance of every object type. In another embodiment, the instance identifier value is unique at least relative to all object instances of all object types that share a particular custom-attribute table. The instance identifier value can be of any data type that is supported by the application or by the repository DBMS.

Catalog Table

In one embodiment, a catalog table is provided in the repository for storing data that defines (1) the custom attributes of the application object types, and (2) custom object types that are declared by the user and are not included in the repository during the application development. However, the catalog table itself is included in the application data repository during the application development. For this reason, application upgrades "know" of and account for the catalog table, and thus the data defining the custom attributes and the custom object types stored in this table is not overwritten or lost during an upgrade.

The catalog table includes a number of columns. Each row of the table holds data that identifies an object type, data that identifies a custom attribute of the object type, and data that identifies the data type of the custom attribute. Thus, the catalog table may include one or more columns for storing data identifying an object type associated with the particular catalog table row, one or more columns for storing data identifying a custom attribute of the object type, and one or more columns for storing data identifying the data type of the custom attribute. In one embodiment of the invention, the data identifying the object type, the custom attribute, and the data type of the custom attribute are all of a "String" data type. However, since the catalog table columns can have any data type supported by the particular data repository, in different embodiments the data identifying the object type, the custom attribute, and the data type of the custom attribute can also be of any data type supported by the data repository.

A catalog table under one embodiment is shown in FIG. 3. Table 310, as shown, stores data defining custom attributes of existing application object types, as well as data defining the attributes of a custom object type. Table 310 includes a column 312 with a column name "OBJECT_TYPE_NAME" for storing data identifying an object type, a column 314 with a column name "ATTRIBUTE_NAME" for storing data identifying a custom attribute, and a column 316 with a column name "ATTRIBUTE_DATA_TYPE" for storing data identifying the data type of a custom attribute. Row 318 is a typical representative of the rows stored in table 310, and, as shown, stores a value "City" in column "OBJECT_TYPE_NAME", a value "Population" in column "ATTRIBUTE_NAME", and a value "Number" in column "ATTRIBUTE_DATA_TYPE". Thus, row 318 indicates that the object type "City" has a custom attribute named "Population" with a data type of "Number".

Custom Object Types

As mentioned above, the catalog table may store data defining a custom object type that is declared by the user and is not included in the repository during the application development. Each attribute of a custom object type is treated as a custom attribute. Therefore, to define a custom object type, the user inserts a row in the catalog table for each attribute of the custom object type. The row for a particular attribute of the custom object type includes data identifying (1) the custom object type in the column or columns designated for storing object type identification, (2) data identifying the custom attribute in the column or columns designated for storing custom attribute identification, and (3) data identifying the data type of the custom attribute in the column or columns designated for storing data type identification.

An example of defining a custom object type in a catalog table under one embodiment is shown in FIG. 3. Table 310 includes the rows 320, 322, and 324. As shown, rows 320-324 define a custom object type named "County". Row 320 stores a value "County" in column "OBJECT_TYPE_NAME", a value "County_Name" in column "ATTRIBUTE_NAME", and a value "String" in column "ATTRIBUTE_DATA_TYPE". Row 322 stores a value "County" in column "OBJECT_TYPE_NAME", a value "County_State" in column "ATTRIBUTE_NAME", and a value "String" in column "ATTRIBUTE_DATA_TYPE". Row 324 stores a value "County" in column "OBJECT_TYPE_NAME", a value "County_Area" in column "ATTRIBUTE_NAME", and a value "Number" in column "ATTRIBUTE_DATA_TYPE". Thus, the object type "County" includes the attribute "County_Name" of "String" data type, the attribute "County_State" of "String" data type, and the attribute "County_Area" of "Number" data type. The custom object type "County", which does not have any default attributes mapped to columns of a repository table defined during the application development, is defined entirely in the catalog table. This technique allows a user to extend the application with unlimited number of custom object types without adding user-specific custom repository tables.

A user may define a custom object type or a custom attribute of existing object type by inserting row or rows in the catalog table. The user may insert rows in the catalog table by using the Data Manipulation Language supported by the repository DBMS. However, any mechanism that can receive commands from a user and can manipulate repository table data, such as a User Interface provided with the particular application, can be used to insert rows in the catalog table.

Storing Data for Custom Attributes and Custom Object Types

Figure 2:
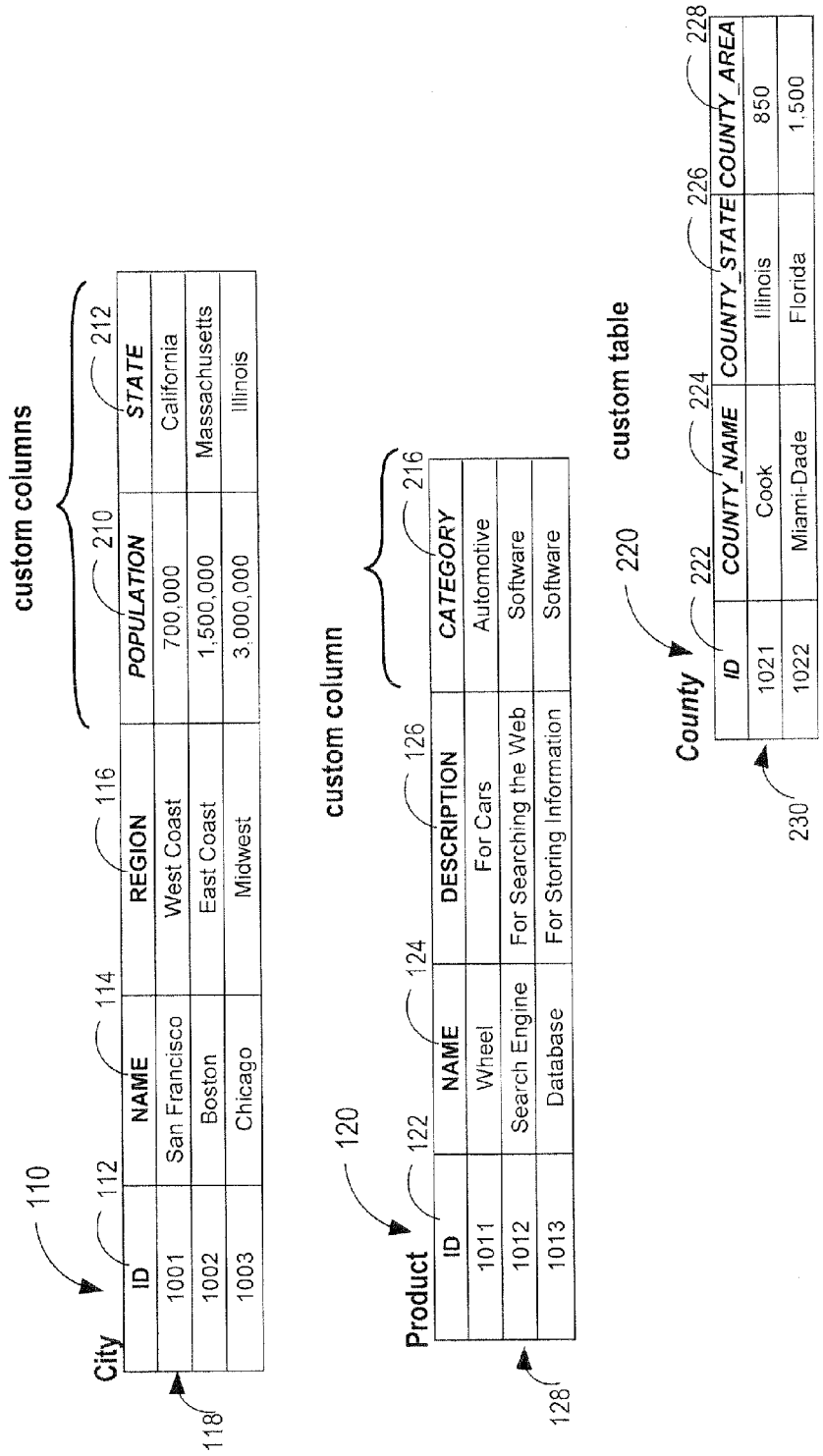
FIG. 2 is a block diagram that illustrates extending the application-provided tables shown in FIG. 1 by adding custom columns and custom tables.

An example of user-extensible partitioning of application attributes under one embodiment is shown in FIG. 3. The example is described with respect to the data and the object types shown in FIG. 2, and, accordingly, the object types "City" and "Product" are deemed default object types defined during the application development, while object type "County" is deemed a custom object type.

As shown in FIG. 3, a catalog table 310 is provided for storing data defining custom object types and custom attributes of existing object types. Tables 326 and 340 are provided for storing the values of attributes for particular object instances. Table 326 is provided for storing attribute values of "String" data type, and table 340 is provided for storing attribute values of "Number" data type.

The catalog table 310 contains rows defining the custom attributes of existing object types. For example, row 318 indicates that the object type "City" includes a custom attribute "Population" of "Number" data type. Similarly, row 352 indicates that object type "City" further includes a custom attribute "State" of "String" data type.

The data for custom attributes of "String" data type is stored in table 326. For example, in row 334, the value for custom attribute "State" of object instance identified by instance identifier "1001" is "California".

The data for custom attributes of "Number" data type is stored in table 340. For example, in row 348, the value for custom attribute "Population" of object instance identified by instance identifier "1001" is "700,000".

The catalog table 310 also contains rows 320, 322, and 324 which define the attributes of the custom object type "County". Row 320 indicates that the custom object type "County" includes an attribute "County_Name" of "String" data type, row 322 indicates that the custom object type "County" further includes an attribute "County_State" of "String" data type, and row 324 indicates that the custom object type "County" also includes an attribute "County_Area" of "Number" data type.

The data for the attributes of the "County" custom object type having "String" data type is stored in table 326. Thus, in row 336, the value for the attribute "County_Name" of object instance identified by instance identifier "1021" is "Cook", and in row 338, the value for attribute "County_State" of object instance identified by instance identifier "1021" is "Illinois". The data for the attributes of the "County" custom object type having "Number" data type is stored in table 340. Thus, in row 350, the value for attribute "County_Area" of object instance identified by instance identifier "1021" is "850".

Retrieving Data for Custom Attributes

Techniques are provided for retrieving an object instance of an application object type, where the object instance includes data for a custom attribute of the object type. In response to a request for a particular object instance of an object type, data identifying the data type of a custom attribute of the object type is retrieved from a catalog table. Based on the data type of the custom attribute, the identity of the table storing data for custom attributes of this data type is determined. The data value of the custom attribute for the particular object instance is then retrieved from the table storing data for the custom attribute.

In one embodiment, a first table stores data for one or more default attributes of an object type used by an application, a second table stores data for a first custom attribute of the object type having a first data type, and a third table stores data for a second custom attribute of the object type having a second data type that is different from the first data type. To retrieve data for the first custom attribute of a particular object instance of the object type, the data type of the first custom attribute is determined by reading a value from a column of a catalog table row. The row is identified by matching data identifying the object type to data stored in one or more object type identifying columns of the catalog table, and by matching data identifying the custom attribute to data stored in one or more attribute identifying columns of the catalog table. Based on the data type of the first custom attribute, the identity of the table storing the data for custom attributes of this data type is determined. The value for the first custom attribute of the particular object instance is retrieved from a column of a row of the table storing the data for the custom attribute. The row of the table is identified by matching data uniquely identifying the object instance (usually this is a globally unique object instance identifier) to data stored in one or more instance-identifying columns, and by matching data identifying the first custom attribute to data stored in one or more attribute-identifying columns. Similar steps are performed to retrieve data for the second custom attribute of the particular object instance.

An example of retrieving the value for a custom attribute of an object type may be illustrated with reference to FIG. 3. Suppose the value of custom attribute "Population", of object type "City", needs to be retrieved for object instance "1001". The data type of the custom attribute "Population" is determined by looking it up in the catalog table 310. The row of table 310 holding the data type of this custom attribute is identified by matching the object type identifier "City" to data in column 312, and by matching the attribute identifier "Population" to data in column 314. Thus, the row is identified as row 318, and, from column 316, the data type of the custom attribute "Population" of object type "City" is determined to be "Number". Based on this data type, it is determined that the table holding data for custom attributes of "Number" data type is table 340. The value of custom attribute "Population" of object instance "1001" is then determined by finding the appropriate row in table 340. The object instance identifier "1001" is matched to data in column 342, and the attribute identifier "Population" is matched to data in column 344. Thus, it is determined that row 348 holds the data for custom attribute "Population" for object instance "1001", and from column 346 it is determined that the value is "700,000".

Using the techniques described herein, a user may extend an application that includes multiple default object types to additionally include multiple custom object types. The object types, both default and custom, may have a number of default and custom attributes. The custom attributes may be of more than one different data type. The techniques described above for retrieving data for custom attributes work equally well for any number of custom attributes of any number of object types. Moreover, the techniques described above work equally well for custom attributes having different data types, because data for custom attributes of each data type is stored in separate tables. Furthermore, all of the attributes of a custom object type may be retrieved using the techniques described above, because a custom object type is entirely defined in the catalog table and all of its attributes are, in effect, custom attributes.

Keeping Catalog Table Data in Memory

To retrieve all of the data associated with an object instance, the application must know all of the attributes of the object instance, including any custom attributes. To know the custom attributes, the application must know the information contained in the catalog table. However, it is very inefficient to scan the catalog table every time any object instance must be retrieved.

Therefore, in order to facilitate faster retrieval of information about the custom attributes, data from catalog table may be kept in data structures within volatile memory. In one embodiment, data from the catalog table identifying all custom attributes of all object types (including custom object types) is read into and retained in volatile memory upon the launching of the application. In a different embodiment, catalog table data that identifies the custom attributes of a particular object type is read into and kept in memory in response to a request to access an object instance of the particular object type.

In the first embodiment, a catalog table stores data that identifies the custom attributes of one or more object types. In response to launching the application, the data identifying the custom attributes of all object types is read from the catalog table. Based on information from the catalog table, data structures indicating the custom attributes of each object type are constructed in volatile memory. Consequently, in response to a request for an object instance of a particular object type, the data structures are inspected and, without accessing the catalog table, the custom attributes of the particular object type are determined.

In the second embodiment, a catalog table stores data that identifies the custom attributes of at least one object type. In response to a request to access an object instance of a particular object type, the data identifying the custom attributes of the particular object type is read from the catalog table. Based on information from the catalog table, data structures indicating the custom attributes of the particular object type are constructed in volatile memory. Consequently, in response to a subsequent request for an object instance of the particular object type, the data structures are inspected and, without accessing the catalog table, the custom attributes of the particular object type are determined.

Hardware Overview

Figure 4:
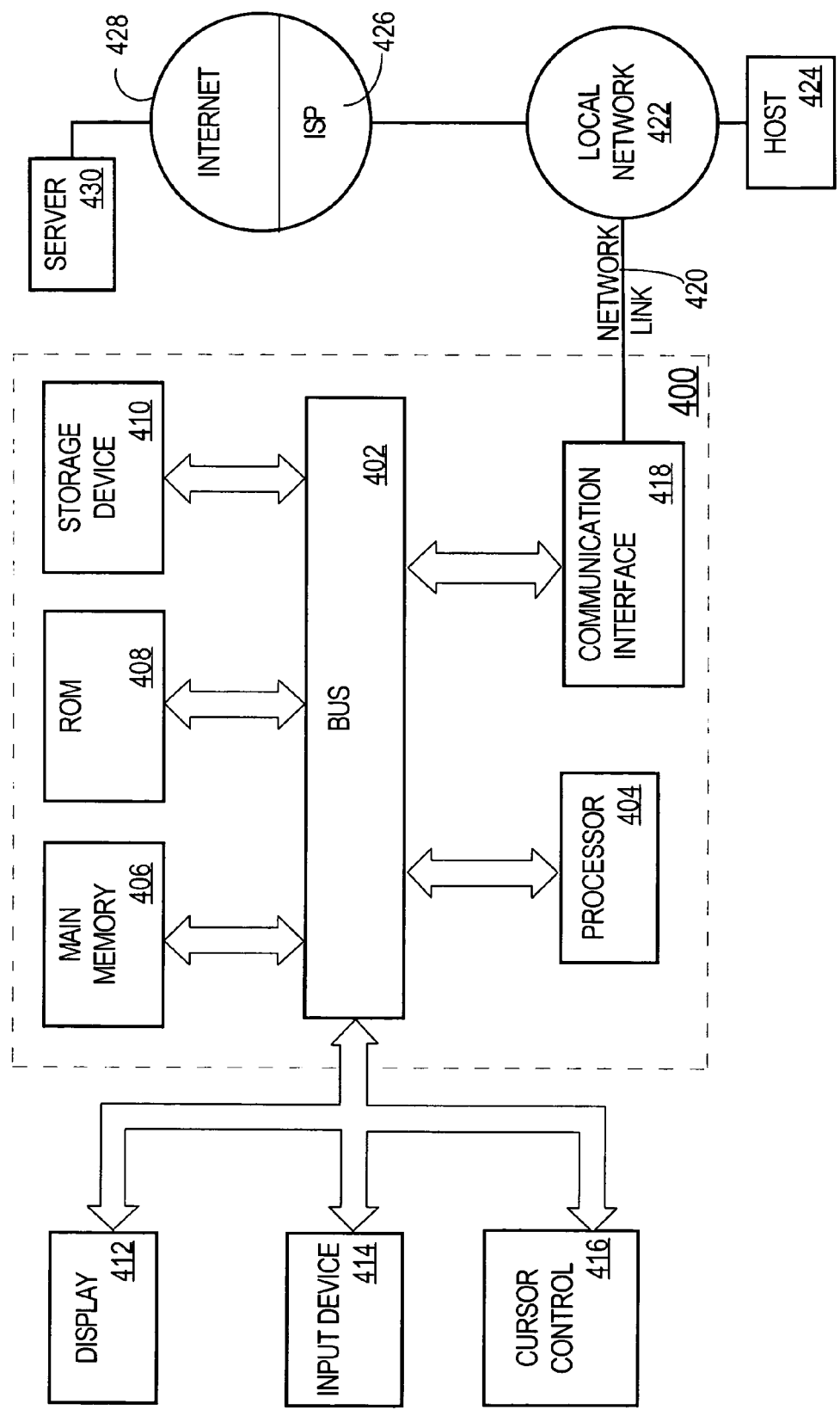
FIG. 4 is a block diagram of a computer system on which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for storing data in a repository comprising the steps of:

storing in a first table data for one or more default attributes of a first object type, wherein a default attribute is an attribute included in a default object type, used by an application;

storing in a second table, separate from said first table, data for one or more default attributes of a second object type used by said application; and storing in a third table, separate from said first and second tables, data for a first custom attribute of said first object type, wherein a custom attribute is an attribute that is added to a default object type, and data for a second custom attribute of said second object type, wherein said first custom attribute and said second custom attribute have the same data type; and upgrading said application, wherein upgrading said application comprises the steps of:

processing the data stored in said first table, wherein processing comprises:

creating a first replacement table to hold the data from said first table;

copying the data from said first table to said first replacement table, wherein data from said one or more default attributes of said first object type is copied from said first table into said first replacement table; and deleting said first table;

processing the data stored in said second table, wherein processing comprises:

creating a second replacement table to hold the data from said second table;

copying the data from said second table to said second replacement table, wherein data from said one or more default attributes of said second object type is copied from said second table to said second replacement table; and deleting said second table; and retaining, in said third table, values for said first custom attribute of said first object type and said second custom attribute of said second object type.

2. The method of claim 1, wherein:

said third table includes at least one instance-identifying column, wherein each row of said third table stores in said at least one instance-identifying column data that uniquely identifies an object instance that is associated with the row;

at least one attribute-identifying column, wherein each row of said third table stores in said at least one attribute-identifying column data that identifies a custom attribute of the object instance that is associated with the row; and at least one value column, wherein each row of said third table stores in said at least one value column one or more values for the custom attribute that is identified in said at least one attribute-identifying column; and said at least one value column of said third table stores data that has the same data type as said first custom attribute and said second custom attribute.

3. The method of claim 1, further comprising the step of retrieving an object instance of said first object type, wherein said object instance of said first object type includes data from said third table associated with said first custom attribute of said first object type.

4. The method of claim 1, wherein:

said third table stores values for custom attributes of a plurality of object types including said first object type and said second object type; and the method further comprises assigning to every instance of every object type of said plurality of object types an instance identifier value that is unique relative to every instance of every object type of said plurality of object types.

5. A method for storing data in a repository comprising the steps of:

storing in a first table data for one or more default attributes of a first object type, wherein a default attribute is an attribute included in a default object type, used by an application;

storing in a second table, separate from said first table, data for one or more default attributes of a second object type used by said application; and storing in a third table, separate from said first and second tables, data for a first custom attribute of said first object type, wherein a custom attribute is an attribute that is added to a default object type, and data for a second custom attribute of said second object type, wherein said first custom attribute and said second custom attribute have the same data type; and storing, in a catalog table, data defining said first custom attribute of said first object type and said second custom attribute of said second object type; and wherein said catalog table stores data that identifies custom attributes for at least one object type;

the method further comprises performing the following steps in response to a request to access an object instance of a particular object type:

reading said catalog table to determine the custom attributes of said particular object type; and based on information from said catalog table, constructing in volatile memory data structures that indicate the custom attributes of said particular object type; and in response to a subsequent request to access a different object instance of said particular object type, inspecting said data structures, without accessing said catalog table, to determine the custom attributes of said particular object type.

6. The method of claim 5, wherein said catalog table includes:

at least one first catalog column, wherein each row of said catalog table stores, within said at least one first catalog column, data that identifies an object type associated with the row, at least one second catalog column, wherein each row of said catalog table stores, within said at least one second catalog column, data that identifies a custom attribute of the object type that is associated with the row, and at least one third catalog column, wherein each row of said catalog table stores, within said at least one third catalog column, data identifying a data type of the custom attribute that is identified in said second catalog column.

7. The method of claim 6, the method further comprising the step of retrieving, in response to a request for an object instance of said first object type, the value of said first custom attribute associated with said object instance by performing the steps of:

determining the data type of said first custom attribute from said third catalog column of a catalog-table row stored in said catalog table, wherein:

data in said at least one first catalog column of said catalog-table row matches data identifying said first object type; and data in said at least one second catalog column of said catalog-table row matches data identifying said first custom attribute;

based on the data type of said first custom attribute, determining the identity of said third table; and retrieving, from a value column of a third-table row stored in said third table, the value of said first custom attribute, wherein:

data uniquely identifying said object instance matches data in at least one instance-identifying column of said third-table row; and data identifying said first custom attribute matches data in at least one attribute-identifying column of said third-table row.

8. The method of claim 6, further comprising the step of storing in said catalog table data defining a custom object type, separate from said first object type and said second object type, wherein the step of storing said custom object type includes the step of inserting a row into said catalog table, wherein said row includes:

within said at least one first catalog column, data that identifies said custom object type;

within said at least one second catalog column, data that identifies a custom attribute of said custom object type, and within said at least one third catalog column, data identifying a data type of said custom attribute that is identified in said at least one second catalog column.

9. A method for storing data in a repository comprising the steps of:

storing in a first table data for one or more default attributes of a first object type, wherein a default attribute is an attribute included in a default object type, used by an application;

storing in a second table, separate from said first table, data for one or more default attributes of a second object type used by said application; and storing in a third table, separate from said first and second tables, data for a first custom attribute of said first object type, wherein a custom attribute is an attribute that is added to a default object type, and data for a second custom attribute of said second object type, wherein said first custom attribute and said second custom attribute have the same data type; and storing, in a catalog table, data defining said first custom attribute of said first object type and said second custom attribute of said second object type; and wherein said catalog table stores data that identifies custom attributes for a plurality of object types;

the method further comprises performing the following steps in response to said application being launched:

reading said catalog table to determine custom attributes from said plurality of object types; and based on information from said catalog table, constructing in volatile memory data structures that indicate the custom attributes of each of said plurality of object types; and in response to a request to access a different object instance of a particular object type of said plurality of object types, inspecting said data structures, without accessing said catalog table, to determine the custom attributes of said particular object type.

10. A method for storing data in a repository comprising the steps of:

storing in a first table data for one or more default attributes of an object type used by an application;

storing in a second table, separate from said first table, data for a first custom attribute of said object type that is of a first data type; and storing in a third table, separate from said first and second tables, data for a second custom attribute of said object type that is of a second data type, wherein said first custom attribute and said second custom attribute have different data types; and upgrading said application, wherein upgrading said application comprises the steps of:

processing the data stored in said first table, wherein processing comprises:

creating a first replacement table to hold the data from said first table;

copying the data from said first table to said first replacement table, wherein data from said one or more default attributes of said object type is copied from said first table into said first replacement table; and deleting said first table;

retaining, in said second table, values for said first custom attribute of said object type; and retaining, in said third table, values for said second custom attribute of said object type.

11. The method of claim 10, wherein:

said object type is a first object type of a plurality of object types used by said application; and the method further includes:

storing in a fourth table, separate from said first, second and third tables, data for one or more default attributes of a second object type of said plurality of object types; and storing in said second table data for a third custom attribute of said second object type, wherein said third custom attribute of said second object type is of said first data type.

12. The method of claim 10, wherein:

said second table includes at least one instance-identifying column, wherein each row of said second table stores in said at least one instance-identifying column data that uniquely identifies an object instance that is associated with the row;

at least one attribute-identifying column, wherein each row of said second table stores in said at least one attribute-identifying column data that identifies a custom attribute of the object instance that is associated with the row; and at least one value column, wherein each row of said second table stores in said at least one value column one or more values for the custom attribute that is identified in said at least one attribute-identifying column; and said at least one value column of said second table stores data that has the same data type as said first custom attribute.

13. The method of claim 10, further comprising the step of retrieving an object instance of said object type, wherein said object instance of said object type includes data from said second table associated with said first custom attribute of said object type.

14. The method of claim 10, wherein:

said second table stores values for custom attributes of a plurality of object types including said object type, wherein the custom attributes are of said first data type;

said third table stores values for custom attributes of a plurality of object types including said object type, wherein the custom attributes are of said second data type; and the method further comprises assigning to every instance of every object type of said plurality of object types an instance identifier value that is unique relative to every instance of every object type of said plurality of object types.

15. A method for storing data in a repository comprising the steps of:

storing in a first table data for one or more default attributes of an object type used by an application;

storing in a second table, separate from said first table, data for a first custom attribute of said object type that is of a first data type; and storing in a third table, separate from said first and second tables, data for a second custom attribute of said object type that is of a second data type, wherein said first custom attribute and said second custom attribute have different data types; and storing, in a catalog table, data defining said first custom attribute of said object type and said second custom attribute of said object type; and wherein said catalog table stores data that identifies custom attributes for at least one object type;

the method further comprises performing the following steps in response to a request to access an object instance of a particular object type:

reading said catalog table to determine the custom attributes of said particular object type; and based on information from said catalog table, constructing in volatile memory data structures that indicate the custom attributes of said particular object type; and in response to a subsequent request to access an object instance of said particular object type, inspecting said data structures, without accessing said catalog table, to determine the custom attributes of said particular object type.

16. The method of claim 15, wherein said catalog table includes:

at least one first catalog column, wherein each row of said catalog table stores, within said at least one first catalog column, data that identifies an object type associated with the row, at least one second catalog column, wherein each row of said catalog table stores, within said at least one second catalog column, data that identifies a custom attribute of the object type that is associated with the row, and at least one third catalog column, wherein each row of said catalog table stores, within said at least one third catalog column, data identifying a data type of the custom attribute that is identified in said second catalog column.

17. The method of claim 16, the method further comprising the step of retrieving, in response to a request for an object instance of said object type, the value of said first custom attribute associated with said object instance by performing the steps of:
  determining the data type of said first custom attribute from said third catalog column of a catalog-table row stored in said catalog table, wherein:
    data in said at least one first catalog column of said catalog-table row matches data identifying said object type; and
    data in said at least one second catalog column of said catalog-table row matches data identifying said first custom attribute;
  based on the data type of said first custom attribute, determining the identity of said second table; and
  retrieving, from a value column of a second-table row stored in said second table, the value of said first custom attribute, wherein:
    data uniquely identifying said object instance matches data in at least one instance-identifying column of said second-table row; and
    data identifying said first custom attribute matches data in at least one attribute-identifying column of said second-table row.

18. The method of claim 16, further comprising the step of storing in said catalog table data defining a custom object type, separate from said object type, wherein the step of storing said custom object type includes the step of inserting a row into said catalog table, wherein the row includes:
  within said at least one first catalog column, data that identifies said custom object type;
  within said at least one second catalog column, data that identifies a custom attribute of said custom object type, and
  within said at least one third catalog column, data identifying a data type of said custom attribute that is identified in said at least one second catalog column.

19. A method for storing data in a repository comprising the steps of:
  storing in a first table data for one or more default attributes of an object type used by an application;
  storing in a second table, separate from said first table, data for a first custom attribute of said object type that is of a first data type; and
  storing in a third table, separate from said first and second tables, data for a second custom attribute of said object type that is of a second data type, wherein said first custom attribute and said second custom attribute have different data types; and
  storing, in a catalog table, data defining said first custom attribute of said object type and said second custom attribute of said object type; and wherein
  said catalog table stores data that identifies custom attributes for a plurality of object types;
  the method further comprises performing the following steps in response to said application being launched:
    reading said catalog table to determine custom attributes from said plurality of object types; and
    based on information from said catalog table, constructing in volatile memory data structures that indicate the custom attributes of each of said plurality of object types; and
  in response to a request to access an object instance of a particular object type of said plurality of object types, inspecting said data structures, without accessing said catalog table, to determine the custom attributes of said particular object type.

20. A computer-readable storage medium carrying one or more sequences of instructions which, when executed by one or more processors, causes the one or more processors to perform the method recited in claim 1.

21. A computer-readable storage medium carrying one or more sequences of instructions which, when executed by one or more processors, causes the one or more processors to perform the method recited in claim 2.

22. A computer-readable storage medium carrying one or more sequences of instructions which, when executed by one or more processors, causes the one or more processors to perform the method recited in claim 3.

23. A computer-readable storage medium carrying one or more sequences of instructions which, when executed by one or more processors, causes the one or more processors to perform the method recited in claim 4.

24. A computer-readable storage medium carrying one or more sequences of instructions which, when executed by one or more processors, causes the one or more processors to perform the method recited in claim 5.

25. A computer-readable storage medium carrying one or more sequences of instructions which, when executed by one or more processors, causes the one or more processors to perform the method recited in claim 6.

26. A computer-readable storage medium carrying one or more sequences of instructions which, when executed by one or more processors, causes the one or more processors to perform the method recited in claim 7.

27. A computer-readable storage medium carrying one or more sequences of instructions which, when executed by one or more processors, causes the one or more processors to perform the method recited in claim 8.

28. A computer-readable storage medium carrying one or more sequences of instructions which, when executed by one or more processors, causes the one or more processors to perform the method recited in claim 9.

29. A computer-readable storage medium carrying one or more sequences of instructions which, when executed by one or more processors, causes the one or more processors to perform the method recited in claim 10.

30. A computer-readable storage medium carrying one or more sequences of instructions which, when executed by one or more processors, causes the one or more processors to perform the method recited in claim 11.

31. A computer-readable storage medium carrying one or more sequences of instructions which, when executed by one or more processors, causes the one or more processors to perform the method recited in claim 12.

32. A computer-readable storage medium carrying one or more sequences of instructions which, when executed by one or more processors, causes the one or more processors to perform the method recited in claim 13.

33. A computer-readable storage medium carrying one or more sequences of instructions which, when executed by one or more processors, causes the one or more processors to perform the method recited in claim 14.

34. A computer-readable storage medium carrying one or more sequences of instructions which, when executed by one or more processors, causes the one or more processors to perform the method recited in claim 15.

35. A computer-readable storage medium carrying one or more sequences of instructions which, when executed by one or more processors, causes the one or more processors to perform the method recited in claim 16.

36. A computer-readable storage medium carrying one or more sequences of instructions which, when executed by one or more processors, causes the one or more processors to perform the method recited in claim 17.

37. A computer-readable storage medium carrying one or more sequences of instructions which, when executed by one or more processors, causes the one or more processors to perform the method recited in claim 18.

38. A computer-readable storage medium carrying one or more sequences of instructions which, when executed by one or more processors, causes the one or more processors to perform the method recited in claim 19.

* * * * *